(12) United States Patent
Laudet et al.

(10) Patent No.: US 6,803,105 B1
(45) Date of Patent: Oct. 12, 2004

(54) CALCIUM OXIDE PRODUCT AND METHOD FOR MAKING SAME

(75) Inventors: Alain Laudet, Namur (BE); Erwan Gueguen, Villers-la-Ville (BE)

(73) Assignee: S. A. Lhoist Recherche et Developpement (BE)

( * ) Notice: Subject to any disclaimer, the term of this patent is extended or adjusted under 35 U.S.C. 154(b) by 50 days.

(21) Appl. No.: 10/089,897

(22) PCT Filed: Oct. 5, 2000

(86) PCT No.: PCT/BE00/00116

§ 371 (c)(1),
(2), (4) Date: Jun. 7, 2002

(87) PCT Pub. No.: WO01/27031

PCT Pub. Date: Apr. 19, 2001

(30) Foreign Application Priority Data

Oct. 8, 1999 (BE) ............................................. 9900667

(51) Int. Cl.⁷ ............................. B32B 5/16; B05D 1/02; B05D 1/34

(52) U.S. Cl. ....................... 428/403; 427/215; 427/220; 427/421; 427/422

(58) Field of Search ................................ 427/215, 220, 427/421, 422; 428/403

(56) References Cited

U.S. PATENT DOCUMENTS

| | | | | | |
|---|---|---|---|---|---|
| 3,965,051 | A | * | 6/1976 | Markusch et al. | 521/100 |
| 4,032,354 | A | * | 6/1977 | Fraser | 106/260 |
| 4,039,697 | A | * | 8/1977 | Isawa et al. | 427/475 |
| 4,882,225 | A | * | 11/1989 | Fukui et al. | 428/405 |
| 5,624,998 | A | * | 4/1997 | Itoh et al. | 524/812 |
| 5,997,601 | A | * | 12/1999 | Kust | 71/27 |
| 6,406,538 | B1 | * | 6/2002 | Laudet et al. | 106/792 |

FOREIGN PATENT DOCUMENTS

JP 58-180225 * 10/1983 ............. 423/267

* cited by examiner

Primary Examiner—H. Thi Le
(74) Attorney, Agent, or Firm—Charles D. Gunter, Jr.

(57) ABSTRACT

The invention concerns a product based on calcium oxide in the form of rough grains, comprising a protective film coating the grains, based on at least a film-forming compound, which is solid at room temperature and which, when applied on the grains, is in solution or in emulsion in a vaporable aqueous phase. The invention also concerns a method for making said product.

11 Claims, No Drawings

CALCIUM OXIDE PRODUCT AND METHOD FOR MAKING SAME

The present invention relates to a product based on calcium oxide in the form of coarse grains and a method of manufacturing such a product.

In the present invention, product based on calcium oxide means not only quick lime CaO, but also unhydrated dolomite CaO.MgO, and all intermediaries xCaO. (1−x)MgO, where x is equal to or less than 1 but greater than 0.

These products based on calcium oxide in the form of coarse grains are in the form of grains whose size is greater than 10 mm, and is preferably between 10 and 70 mm.

The present invention therefore does not relate to the processing of lime in powder form or with fine grains, as provided for for example in JP-58180225, JP-56050115 and JP61261242.

It is possible to obtain products based on such coarse grains by baking a raw material, such as for example limestone, and then screening the product obtained, known as rock lime. Rock lime according to the invention means not only this, but also rock dolomite, and intermediates such as dolomitic rock lime. It is also possible to obtain products based on calcium oxide in the form of coarse grains within the meaning of the invention by compacting fine particles of quick lime, unhydrated dolomite or the aforementioned intermediates, and forming from this material small briquettes or tablets of the size indicated above.

Rock lime generates fines at the various steps of its handling, from its removal from the furnace at the end of the baking of the raw material until it is used by the user, for example as an additive in steel making converters. The fines are produced by fragmentation of the lime grains, when they fall during the loading or unloading of a lorry or silo, or by attrition during friction between the lime grains during transportation by lorry or on conveyer belts.

Likewise the aforementioned briquettes based on calcium oxide refragment during their handling and more or less rapidly reform a new fraction of fines.

Fines, within the meaning of the invention, means any particle whose size is less than the nominal size of the product used. For example, if the user requires a product with a granulometry from 10 to 70 mm, the fines will be formed from particles with a size of less than 10 mm. In a case of this type, the proportion of fines (0 to 10 mm) represents ±3% of the mass of rock lime, at the discharge from the furnace. It may attain 8 to 10% after unloading at the user. If for example a steelmaker is involved, the proportion of fines may reach 15 to 25% at the time of feeding into the converter. When these fines fly off during the transportation and handling of the lime, this represents not only a considerable economic loss, but also constitutes a not insignificant source of pollution, whose treatment is becoming more and more expensive.

It is obviously possible to reduce the emission of fines by screening operations and an improvement to infrastructures, in order to reduce the height of the falls.

The aim of the present invention is to develop a product based on calcium oxide in the form of coarse grains which offers improved mechanical strength and consequently a reduction in the attrition of material and its fragmentation by impacts and therefore a reduction in the emission of dust during the handling thereof. Another aim of it is to produce a method of manufacturing a product based on calcium oxide in the form of coarse grains which improves the said mechanical strength of the product. Advantageously, the product according to the invention must be able to be in a form impermeable to moisture in order to improve its storage properties.

These problems have been resolved, according to the invention, by a product based on calcium oxide in the form of coarse grains which has a protective film coating the grains, based on at least one film-forming compound, which is solid at room temperature and which, during application to the grains, is in solution or emulsion in a vaporisable aqueous phase.

The present invention therefore consists of acting on the material by coating grains with a protective film which will reduce the phenomena of attrition and fragmentation of the grains, this film solidifying when the aqueous phase evaporates.

According to an advantageous embodiment of the invention, the said aqueous phase is water and the product also comprises, on the surface of the grains, a thin layer of hydrated lime which is coated with the said hardened protective film.

A reaction of hydration of CaO into $Ca(OH)_2$ occurs at the surface of the grains based on calcium oxide during the application of the aqueous solution or emulsion of the film-forming compound. This reaction is sufficiently exothermic to raise the temperature locally, up to about one hundred degrees Celsius, and to almost instantaneously evaporate the water which has not yet reacted, which affords a very rapid hardening of the surface protective film. The speed of the coating is favourable in an industrial process since it reduces the time taken for obtaining an easily handleable product. In addition, the water, in evaporating, does not emit any harmful, flammable or explosible vapours and therefore represents an entirely preferential liquid phase. It should also be remarked that thin layer of hydrated lime means according to the invention not only a layer of pure hydrated lime but also hydrated lime partially containing hydrated magnesia.

The film-forming compounds according to the invention must be soluble or capable of forming an emulsion in an aqueous phase and be capable of hardening after the evaporation thereof, forming a solid phase which, at room temperature, coats the grains. As film-forming compounds of this type it is in particular possible to cite, by way of non-limiting examples, vinyl homopolymers or copolymers, such as polyvinyl alcohol, polyvinyl acetate, a vinyl ethylene-acetate copolymer, acrylic homopolymers or copolymers, such as $C_1$–$C_{18}$ alkyl esters of acrylic acid or methacrylic acid, paraffins, notably short-chain paraffins, homopolymers or copolymers of butadiene, isoprene and styrene, silicones or mixtures of these compounds. A vinyl ethylene-acetate copolymer has proved to be particularly favourable as a film-forming compound according to the invention. In particular silicones or polyisoprene are envisaged for producing grains which are not only mechanically strong but also relatively impermeable to water.

Advantageously, in the hardened state, this film-forming compound forms around the grains a film of protective coating which has a thickness of less than 100 $\mu$m.

Details and particularities of the product according to the invention are also indicated in the claims which follow.

The invention also concerns a method of treating a product based on calcium oxide in the form of coarse grains.

According to the invention, this method comprises
an application, on the surface of the said grains obtained, of a solution or emulsion in an aqueous phase of at least one film-forming compound, solid at room temperature, evaporation of the aqueous phase, and hardening of a protective film of the said at least one film-forming compound, coating the grains.

This method is particularly simple, inexpensive to implement, and has above all the advantage of low consumption in a coating environment. Advantageously, after evaporation of the aqueous phase, a protective solid film is obtained with a thickness of only a few tens of micrometres.

According to a preferred embodiment of the invention, the method comprises, during the above mentioned application, an exothermic reaction between part of the aqueous phase and the calcium oxide contained in the grains, formation of a thin layer of hydrated lime on the surface of the grains, and instantaneous evaporation of the remaining aqueous phase caused by an increase in temperature resulting from the said exothermic reaction, which gives rise to a rapid hardening of the said protective film.

According to one advantageous embodiment, the application is implemented by spraying, nebulisation or atomisation of the said solution or emulsion. It is thus possible to spray, nebulise or atomise the solution or emulsion on the surface of the grains, for example while they are being transported on a conveyer belt, on which the product must pass, whether or not it is treated according to the invention. There is thus a saving in special heavy equipment for executing the invention.

Details and particularities of the method according to the invention are also to be taken from Claims which follow.

The product and the method according to the invention will now be illustrated by means of non-limiting examples.

EXAMPLE 1

26 g of an aqueous solution of vinyl ethylene-acetate copolymer, with a dry matter content of 38%, was sprayed onto 2 kg of rock lime of size 10/55 in order to obtain, after evaporation of the water following the increase in temperature due to the slight hydration of the surface of the grains, a gain of 3% by weight in the sample.

The resistance to attrition of the rock lime was measured before and after treatment according to the following protocol:

1 kg of rock lime, whose fraction <10 mm was eliminated by sieving, was rotated in a cylindrical drum 305 mm in diameter and 206 mm long, the drum rotated about its axis at 55 revolutions/min.

At the end of this test, that is to say after 275 rotations, the percentage of particles less than 10 mm was determined, that is to say 17.8% for the non-coated rock lime and 6.8% for the lime coated according to the method described above. This treatment therefore reduces the emission of dust by 62%.

EXAMPLE 2

24 g of an aqueous solution of short-chain paraffins with a cationic emulsifier, whose dry matter content was between 35 and 38% (Mobilcer 638 from Mobil+20% water), was sprayed onto 2 kg of rock lime of size 10/55. This treatment reduced the emission of dust by 10.5% compared with the untreated lime sample under the attrition test conditions described in Example 1.

EXAMPLE 3

24 g of an aqueous solution of paraffins, obtained in the presence of an anionic surfactant and whose dry matter content was between 35 and 38% (Mobilcer X from Mobil+ 20% water), was sprayed onto 2 kg of rock lime of size 10/55. This treatment reduced the emission of dust by 23.5% compared with the sample of untreated lime under the attrition test conditions described in Example 1.

EXAMPLE 4

36 g of an aqueous solution of vinyl ethylene-acetate copolymer, whose dry matter content was 27.6%, with a mineral filler of 5% calcium hydroxide, was sprayed onto 2 kg of rock lime of size 10/55.

This treatment reduced the emission of dust by 61.4% compared with the sample of untreated lime under the attrition test conditions described in Example 1.

EXAMPLE 5

Samples of lime were also compared on the basis of a drop test.

This test consisted of subjecting 5 kg of rock lime, whose grains with a size of less than 10 mm had been eliminated by sieving, to 4 successive drops from a height of 2 mm, through a 40 cm diameter tube, onto a metallic surface. At the end of these 4 drops, the percentage of fines less than 10 mm was determined.

After the 4 drops, respectively 12.7% of fines less than 10 mm for the untreated lime was obtained.

When a lime treated in accordance with Example 1 was subjected to this test, on the other hand only 6.8% fines was obtained.

This treatment therefore reduces by 46.5% the level of fines less than 10 mm caused by the fragmentation of the grains during their fall under the test conditions.

It must be understood that the present invention is in no way limited to the examples and embodiments given above and that many modifications can be made thereto without departing from the scope of the accompanying claims.

It is for example possible to provide, as a composition for coating the rock lime, an aqueous solution, for example polyvinyl alcohol.

What is claimed is:

1. A product based on calcium oxide in the form of coarse grains, comprising;
   a protective film coating the grains, based on at least one film-forming compound, which is solid at room temperature and which, during application to the grains, is in solution or emulsion in a vaporizable aqueous phase; and
   on the surface of the grains, a layer of hydrated lime which is coated with the said solid film-forming compound.

2. A product according to claim 1, wherein the said aqueous phase is water.

3. A product according to claim 1, wherein the film-forming compound, solid at room temperature, is chosen from the group consisting of vinyl homopolymers or copolymers, acrylic homopolymers or copolymers, paraffins, homopolymers or copolymers of butadiene, isoprene and styrene, silicones and mixtures thereof.

4. A product according to claim 1, which is formed on the basis of at least one substance complying with the formula $xCaO.(1-x)MgO$, where x is equal to or less than 1 but greater than 0.

5. A product according to claim 1, in the form of grains with a size of at least 10 mm.

6. A product according to claim 1, wherein the protective film has a thickness of less than 100 $\mu$m.

7. A method of treating a product based on calcium oxide in the form of coarse grains, comprising application, on the surface of the said grains, of a solution or emulsion in an aqueous phase of at least one film-forming compound, solid at room temperature; and wherein the method further comprises, during the above mentioned application, an exothermic reaction between some of the aqueous phase and the calcium oxide contained in the grains, formation of a layer of hydrated lime on the surface of the grains, and instantaneous evaporation of the remaining aqueous phase caused by an increase in temperature resulting from the said exothermic reaction, which gives rise to a rapid hardening of the said protective film.

8. A method according to claim 7, comprising, during and/or after the said application, a heating of the product in order to evaporate the aqueous phase.

9. A method according to claim 7, wherein the application is implemented by spraying, nebulization or atomization of the said solution or emulsion on the said grains.

10. A product based on calcium oxide in the form of grains having a size of at least 10 mm, comprising:

a protective film coating the grains, based on at least one film-forming compound, which is solid at room temperature, and which during application to the grains, is in solution or emulsion in a vaporizable aqueous phase; and on the surface of the grains, a layer of hydrated lime which is coated with the said solid film-forming compound.

11. A method for treating a product based on calcium oxide in the form of grains having a size of at least 10 mm, comprising:

application, on the surface of the said grains, of a solution or emulsion in an aqueous phase of at least one film-forming compound, solid at room temperature; and wherein during the above mentioned application, an exothermic reaction occurs between some of the aqueous phase and the calcium oxide contained in the grains, whereby there is formed a layer of hydrated lime on the surface of the grains, and whereby instantaneous evaporation of the remaining aqueous phase, caused by an increase in temperature resulting from the said exothermic reaction, gives rise to a rapid hardening of the said protective film.

* * * * *